(12) United States Patent
Duryee et al.

(10) Patent No.: US 9,239,911 B2
(45) Date of Patent: Jan. 19, 2016

(54) REPLACEMENT OF SECURITY CREDENTIALS FOR SECURE PROXYING

(75) Inventors: Christopher Duryee, Durham, NC (US); James Bowes, Dartmouth (CA); Bryan Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 526 days.

(21) Appl. No.: 13/456,486

(22) Filed: Apr. 26, 2012

(65) Prior Publication Data

US 2013/0291076 A1   Oct. 31, 2013

(51) Int. Cl.
*G06F 7/04* (2006.01)
*G06F 21/10* (2013.01)

(52) U.S. Cl.
CPC ...................................... *G06F 21/10* (2013.01)

(58) Field of Classification Search
CPC .................................. G06F 21/10; G06F 21/33
USPC .............................................................. 726/6
See application file for complete search history.

(56) References Cited

U.S. PATENT DOCUMENTS

| | | | |
|---|---|---|---|
| 8,549,300 B1 * | 10/2013 | Kumar et al. | 713/175 |
| 2003/0131259 A1 * | 7/2003 | Barton et al. | 713/201 |
| 2005/0160042 A1 * | 7/2005 | Russell et al. | 705/50 |
| 2011/0154459 A1 * | 6/2011 | Kuang et al. | 726/6 |

* cited by examiner

*Primary Examiner* — Peter Shaw
(74) *Attorney, Agent, or Firm* — Lowenstein Sandler LLP

(57) ABSTRACT

A subscription proxy receives, from an end user system, a request for a resource provided by a content delivery network, the request comprising a local credential associated with the end user system. The subscription proxy identifies a remote credential associated with the content delivery network and corresponding to the local credential. The subscription proxy replaces the local credential in the request with the corresponding remote credential and sends the request for the resource with the remote credential to the content delivery network.

18 Claims, 7 Drawing Sheets

REPLACEMENT OF SECURITY CREDENTIALS FOR SECURE PROXYING

TECHNICAL FIELD

This disclosure relates to the field of computer security and, in particular, to dynamic replacement of security credentials for secure proxying.

BACKGROUND

A content delivery network or content distribution network (CDN) is system of one or more servers deployed in one or more data centers across the Internet. The goal of a CDN is to serve content to end user systems with high availability and high performance. CDNs serve a large portion of Internet content today, including web objects (text, graphics, URLs and scripts), downloadable objects (media files, software, documents), applications (e-commerce, portals), live streaming media, on-demand streaming media, and social networks.

In order to access content from a CDN, certain security or identity credentials may be used. One example of these security credentials is a digital certificate. The use of digital certificates using public and private key encryption methods is widely known in the field of computing, particularly in networked computing. Digital certificates generally follow the X.509 standard, developed by the International Standards Organization (ISO). These certificates create a binding between an entity's public key and its identity. The digital certificates may be issued by the CDN or by a corresponding certificate authority (CA) to a requestor, such as a customer of the CDN. In some cases, the customer may be a corporation or other organization, including multiple end user systems.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for dynamically replacing security credentials for secure proxying. In one embodiment, the dynamic replacement may be performed by a subscription proxy. At its core, the subscription proxy is a service that takes requests that contain one form of authentication or credentials, performs the needed checks to ensure that the incoming request is valid, and then re-encodes the request with a different set of credentials that will be accepted by an upstream server or content provider. One implementation of the subscription proxy works with Secure Socket Layer (SSL) and Hypertext Transfer Protocol (HTTP).

In one embodiment, a software library may be used for low-level SSL calls, and the subscription proxy may chain them together into a pipeline, so that the output of one method serves as input to the next. For example, the subscription proxy may decode an incoming request for a resource into its data and metadata. The metadata may contain the information used to validate that the incoming request is authorized to be re-encoded. The subscription proxy may check the metadata against a mapping of credential (e.g., digital certificate) serial numbers and their originating up-stream credentials, in order to find the correct upstream credential with which to re-encode the request. Assuming that the request has been validated and the upstream certificate is found, the subscription proxy may re-encode the request with that certificate, and send it to the upstream server. The software library used may allow for bidirectional communication, so the subscription proxy is able to re-use the same pipeline to send the data back downstream to the originating client device.

Figure 1:
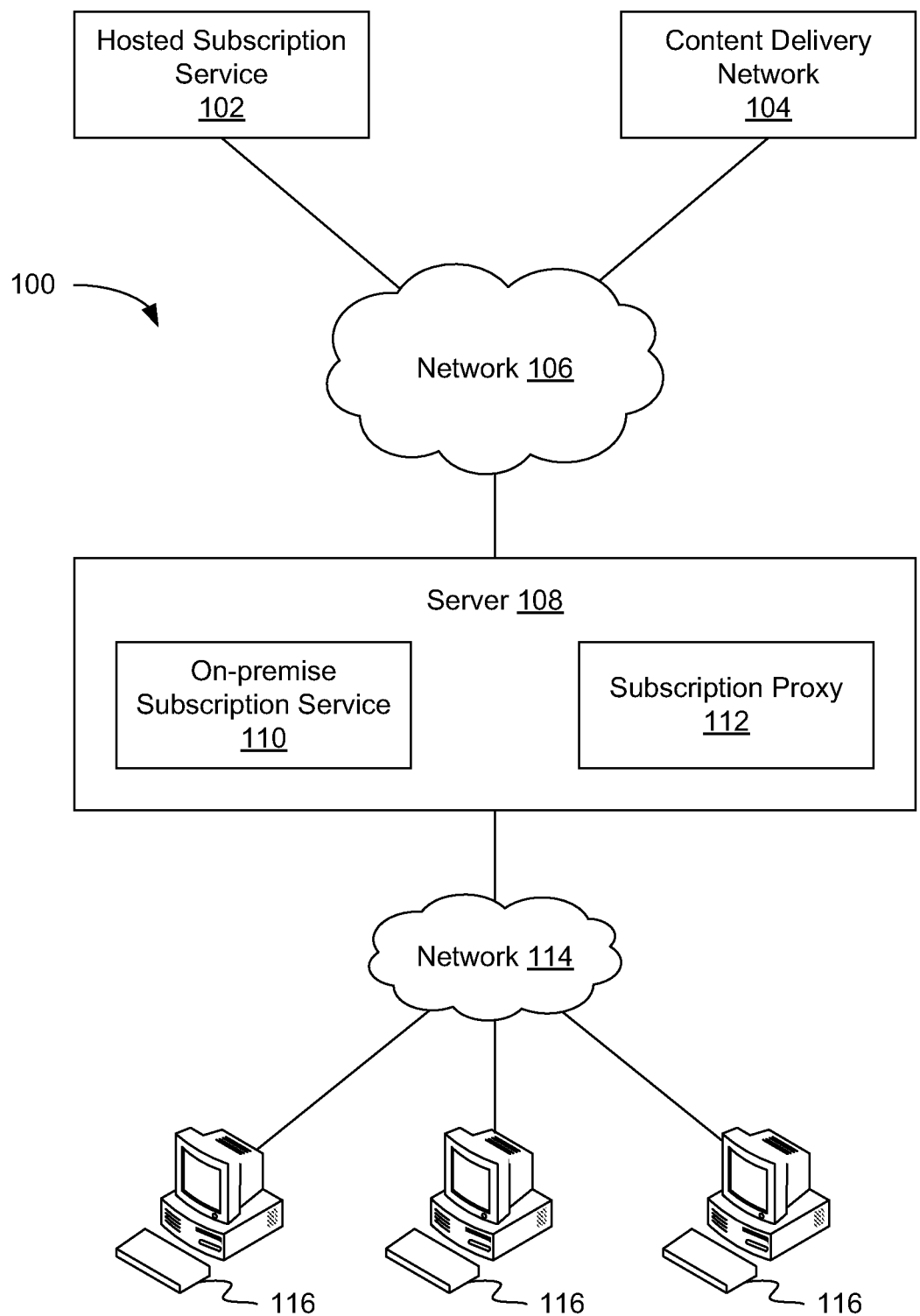
FIG. 1 is a block diagram illustrating a network environment for dynamic replacement of security credentials for secure proxying, according to an embodiment.

FIG. 1 is a block diagram illustrating a network environment for dynamic replacement of security credentials for secure proxying, according to an embodiment of the present invention. In one embodiment, network environment 100 includes hosted subscription service 102, content delivery network (CDN) 104, server 108 and one or more end user systems 116. Hosted subscription service 102, content delivery network 104 and server 108 may be connected through a network 106, which may be, for example, a local area network (LAN), a wide area network (WAN), a global area network (GAN) such as the Internet, or a combination of such networks. Server 108 and end user systems 116 may be connected through a network 114, which may be a separate LAN, WAN, GAN or other network, or may be part of the same network as network 106. The illustrated embodiment shows three end user systems 116; however, in other embodiments, there may be any number of end user systems and network environment 100 may include additional and/or different devices.

Content delivery network 104 may include a system of one or more servers deployed in one or more data centers across network 106 (e.g., the Internet). Content delivery network 104 may serve content to end user systems 116 with high availability and high performance. Content delivery network 104 may provide a wide array of content, such as web objects (text, graphics, URLs and scripts), downloadable objects (media files, software, documents), applications (e-commerce, portals), live streaming media, on-demand streaming media, or a combination of these and/or other forms of content. In one embodiment, content delivery network 104 is owned, operated and/or managed by the developer or creator of the provided content (e.g., a software developer). In another embodiment, a third party manages content delivery network 104 on behalf of the developer.

Hosted subscription service 102 may be an entity that generates and/or issues security credentials, such as digital certificates. A digital certificate certifies the ownership of a public key by the named subject of the certificate. This allows others to rely upon signatures or assertions made by a private key that corresponds to the certified public key. In one embodiment, hosted subscription service 102 is a certificate authority (CA). In one model of trust relationships, a CA is a trusted third party that is trusted by both the subject (owner) of the certificate and the party relying upon the certificate. CAs may be characteristic of many public key infrastructure (PKI) schemes. In one embodiment, hosted subscription service 102 distributes digital certificates or other security credentials (i.e., remote credentials) to customers of content delivery network 104 via network 106. The remote credentials may be used to verify the identity and privileges of a user or customer (e.g., the corporation or organization running server 108) of an upstream or remote entity (e.g., hosted subscription service 102). In addition, the remote credentials may be used to control access to resources, such as content delivery network 104, by server 108. The remote credentials may be referred to as "remote" because they are distributed by an entity external to the corporation or organization running server 108. In one embodiment, the remote security credentials include a SSL X.509 certificate. Content delivery network 104 may distribute or grant access to the content and/or resources (e.g., software downloads or upgrades) to holders of the digital certificates. In one embodiment, hosted subscription service 102 is owned by the same organization that manages content delivery network 104 (e.g., the software developer). In another embodiment, hosted subscription service 102 is some other public or private entity that issues remote security credentials on behalf of content delivery network 104.

In one embodiment, hosted subscription service 102 distributes the remote credentials to customers of content delivery network 104. Hosted subscription service 102 may distribute the remote credentials to server 108 via network 106. Server 108 may be owned by a customer or client of content delivery network 104. Server 108 may be connected to end user systems 116 via local network 114. Each of end user systems 116 may be, for example, a conventional personal computer (PC), workstation, laptop computer, mobile phone, personal digital assistant (PDA) or the like. End user systems 116 may be configured to request content or resources that are available from content delivery network 104.

In one embodiment, server 108 may function as a proxy server. Server 108, may include for example, the computer system 700 described below with respect to FIG. 7. In general, a proxy server acts as an intermediary for requests from clients (e.g., end user systems 116) seeking resources from other servers (e.g., content delivery network 104). An end user system 116 may connect to server 108, requesting some service, such as a file, connection, web page, or other resource available from content delivery network 104. Server 108 evaluates the request as a way to simplify and control complexity from the perspective of end user systems 116. Server 108 may receive the remote security credentials from hosted subscription service 102 and consequently be able to request and receive resources from content delivery network 104. Due to security concerns, for example within the corporate customer network 114, server 108 may not distribute the remote security credentials from hosted subscription service 102 to all or any of end user systems 116.

In one embodiment, server 108 may include on-premise subscription service 110. On-premise subscription service 110 may register with hosted subscription service 102 and receive the remote security credentials associated with content delivery network 104. In addition, on-premise subscription service 110 may provide similar functionality as hosted subscription service 102, but on a smaller scale (e.g., limited to machines connected to network 114). For example, on-premise subscription service 110 may generate and/or distribute local security credentials to end user systems 116. These local security credentials are controlled by the entity that owns server 108 and/or network 114 (e.g., the corporate customer) and may be used to control access to resources outside network 114, such as content delivery network 104, by end user systems 116. The local credentials may also control access to resources within network 114, such as subscription proxy 112 of server 108, by end user systems 116. The local credentials may be referred to as "local" because they are distributed by an entity internal to the corporation or organization running server 108 (e.g., on-premise subscription service 110). In one embodiment, the local security credentials include an SSL X.509 certificate.

In one embodiment, server 108 may additionally include subscription proxy 112. Subscription proxy 112 may allow for dynamic replacement of security credentials to enable secure proxying. Subscription proxy 112 may provide translation between the local security credentials included with a request sent by one of end user systems 116, and the remote security credentials used to obtain the requested resources from content delivery network 104. Subscription proxy 112 may receive the request, authenticate the request based on the local credentials, identify the corresponding remote credentials from on-premise subscription service 110, and forward the request to content delivery network 104 with the remote credentials. This may prevent end user systems 116 from having to be registered with hosted subscription service 102 and/or content delivery network 104 and from having to obtain the appropriate remote security credentials directly.

Figure 2:
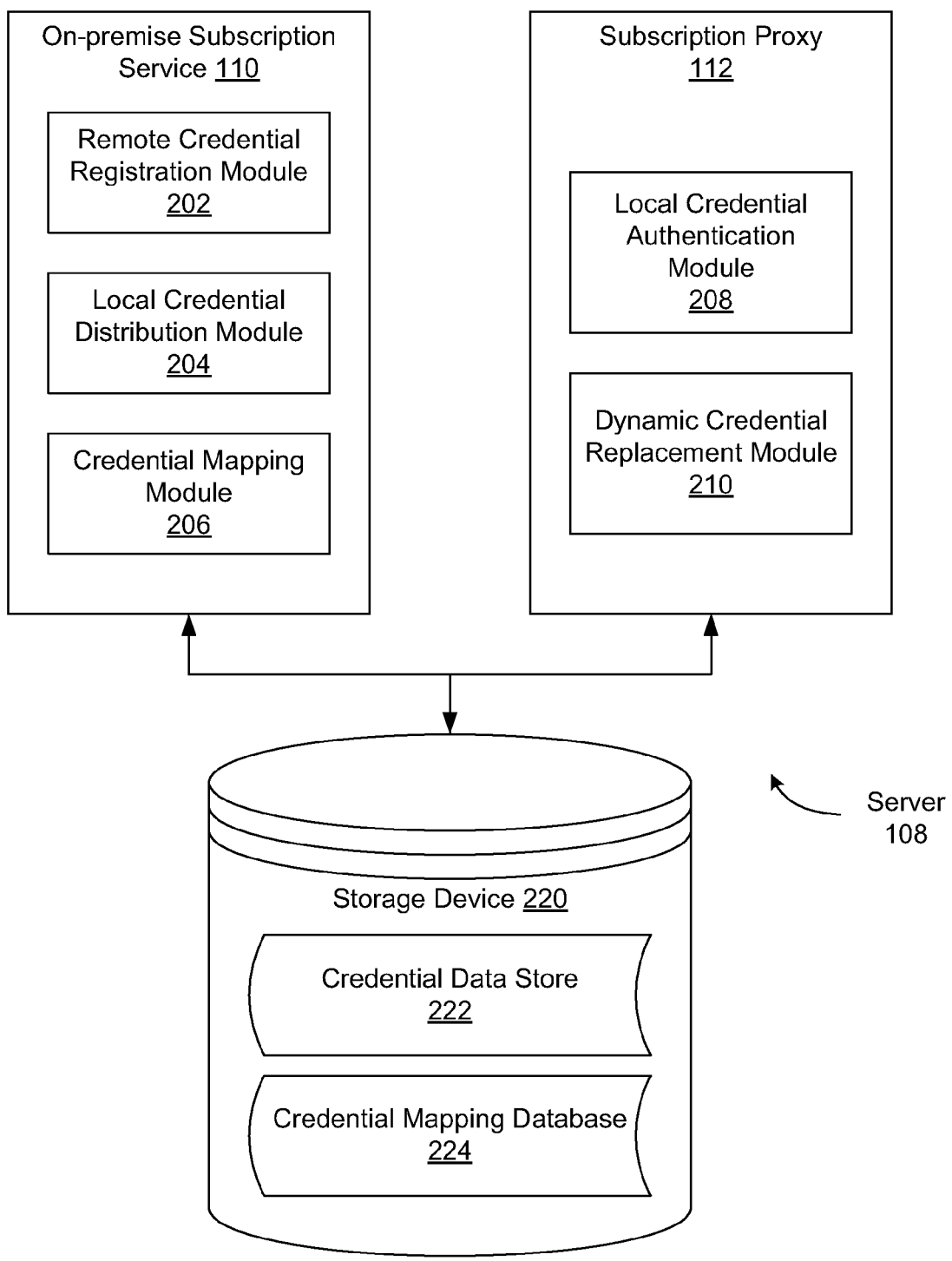
FIG. 2 is a block diagram illustrating an on-premise subscription service and a subscription proxy, according to an embodiment.

FIG. 2 is a block diagram illustrating an on-premise subscription service and a subscription proxy, according to an embodiment of the present invention. In one embodiment, on-premise subscription service 110 may include remote credential registration module 202, local credential distribution module 204 and credential mapping module 206. In one embodiment, subscription proxy 112 may include local credential authentication module 208 and dynamic credential replacement module 210. Each of on-premise subscription service 110 and subscription proxy 112 may be coupled to a storage device 220. In one embodiment, storage device 220 may include credential data store 222 and credential mapping database 224. Storage device 220 may be part of server 108 or may be part of another device in network environment 100 and may be, for example, memory, such as read-only memory (ROM), flash memory, random access memory (RAM), etc., or a mass storage device, such as a magnetic or optical storage device.

Remote credential registration module 202 may be responsible for registering with hosted subscription service 102 and receiving the remote security credentials corresponding to content delivery network 104. In one embodiment, remote credential registration module 202 may request remote security credentials from hosted subscription service 102 in response to an instruction from a user, system administrator, one of end user systems 116 or some other entity or individual. The request may indicate that on-premise subscription service 110 is requesting access to content delivery network 104. Remote credential registration module 202 may receive the remote credentials and store them in credential data store 222 on storage device 220.

Local credential distribution module 204 may generate and distribute local security credentials to connected network devices, such as end user systems 116. The local credentials may be stored in credential data store 222 before being sent to end user systems 116. These local security credentials may be used to authenticate the identity of end user systems 116 and to verify their permissions to download or receive content or resources provided by content delivery network 104. End user systems 116 may include the local credentials with a request for content that is later verified by subscription proxy 112.

Credential mapping module 206 may associate received remote credentials with distributed local credentials. In one embodiment, credential mapping module 206 maintains credential mapping database 224 in storage device 220 which stores a relationship between the remote credentials and the local credentials. Subscription proxy 112 may use this database 224 to determine the relationship when dynamically replacing security credentials in a request for a resource. In other embodiments, credential mapping database 224 may be some other data structure or data store besides a database.

Local credential authentication module 208 may authenticate local security credentials received with a request from one of end user systems 116. In one embodiment, end user systems 116 may direct their requests for content to subscription proxy 112. In addition to an indication of the requested content, the requests may include the local credential provided to the end user system 116 by on-premise subscription service 110. The local credential may include, for example, a digital certificate, as described above. Local credential authentication module 208 may verify that the local credential is properly associated with the end user system 116 from which it was received and that the end user system 116 is authorized to request and receive the indicated content or resource. In one embodiment, local credential authentication module 208 compares the received local credential to a copy of that local credential in credential data store 222.

Dynamic credential replacement module 210 may dynamically replace security credentials to enable secure proxying. Dynamic credential replacement module 210 may provide translation between the local security credentials included with a request sent by one of end user systems 116, and the remote security credentials used to obtain the requested resources from content delivery network 104. Dynamic credential replacement module 210 identify the remote credentials corresponding to the received local credentials using, for example credential mapping database 224. Upon determining the remote credentials, dynamic credential replacement module 210 may forward the request to content delivery network 104 with the remote credentials. Similarly, when the requested content or resource is received from content delivery network 104, dynamic credential replacement module 210 may reverse the process to translate back to the local credentials before providing the resource to the requesting end user system 116.

Figure 3:
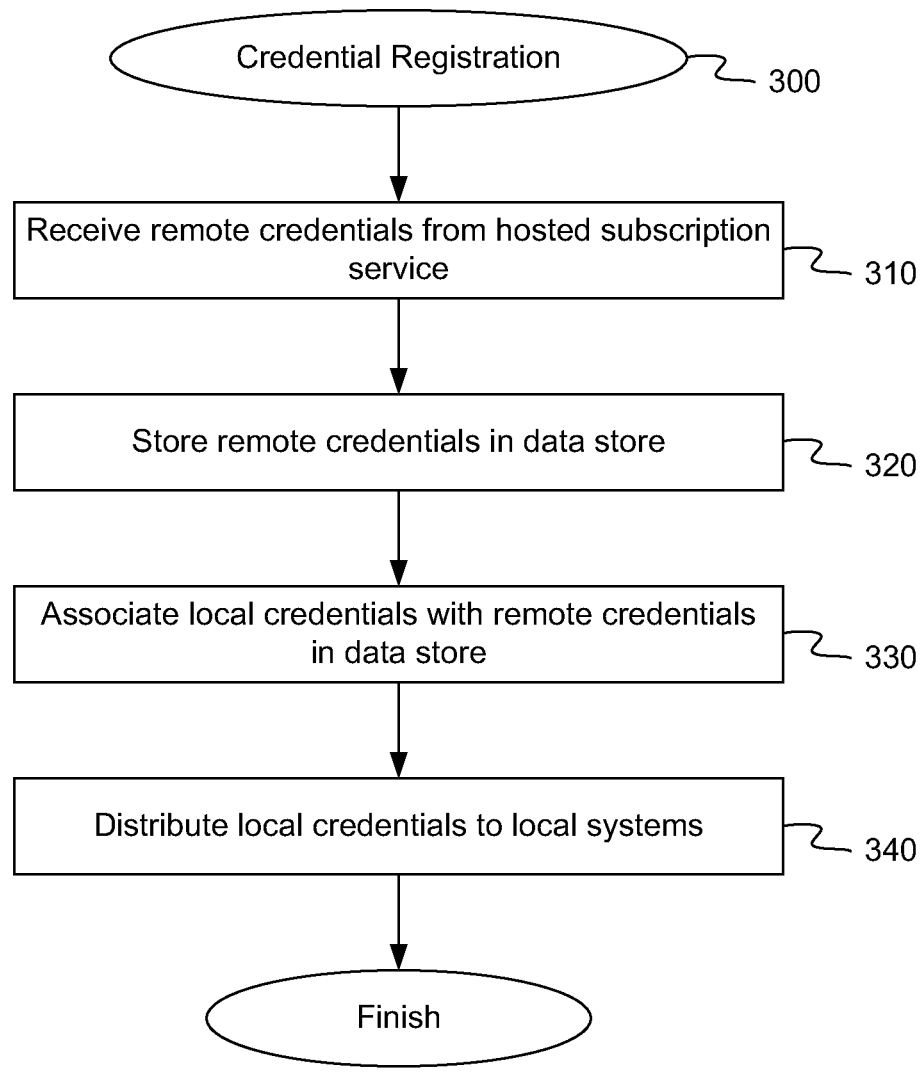
FIG. 3 is a flow diagram illustrating a security credential registration method, according to an embodiment.

FIG. 3 is a flow diagram illustrating a security credential registration method, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to register a server with hosted subscription service in order to receive remote credentials for use in obtaining resources from a content delivery network. In one embodiment, method 300 may be performed by on-premise subscription service 110, as shown in FIGS. 1 and 2.

Referring to FIG. 3, at block 310, method 300 receives remote security credentials from hosted subscription service 102. In one embodiment, remote credential registration module 202 may request remote security credentials from hosted subscription service 102 in response to an instruction from a user, system administrator, one of end user systems 116 or some other entity or individual. The request may indicate that on-premise subscription service 110 is requesting access to content delivery network 104. In other embodiments, some other entity may request that the remote security credentials be sent to remote credential registration module 202, or the remote security credentials may be received without a request. At block 320, method 300 stores the received remote credentials in a data store. In one embodiment, remote credential registration module 202 stores the remote credentials in credential data store 222 of storage device 220. In other embodiments, the remote credentials may be stored in some other location within server 108 or externally.

At block 330, method 300 associates local security credentials with the remote security credentials stored in the data store 222 at block 320. As described above, local credential distribution module 204 may generate and distribute local security credentials to connected network devices, such as end user systems 116. The local credentials may also be stored in credential data store 222. These local security credentials may be used to authenticate the identity of end user systems 116 and to verify their permissions to download or receive content or resources provided by content delivery network 104. In one embodiment, credential mapping module 206 may associate received remote credentials with distributed local credentials. In one embodiment, credential mapping module 206 maintains credential mapping database 224 in storage device 220 which stores a relationship between the remote credentials and the local credentials. Credential mapping module 206 may create a mapping between which local credentials correspond to the received remote credentials for content delivery network 104 and to which end user systems 116 those local credentials are to be distributed. In one embodiment, the local credentials are associated with the remote credentials during the creation of the local credentials. In other embodiments, the local credentials are associated with the remote credentials as part of a separate operation or at a different point in time.

At block 340, method 300 distributes the local credentials to local systems, such as end user systems 116. In one embodiment, local credential distribution module 204 distributes the local credentials to end user systems 116. End user systems 116 may include the local credentials with a request for content that is later verified by subscription proxy 112.

Figure 4:
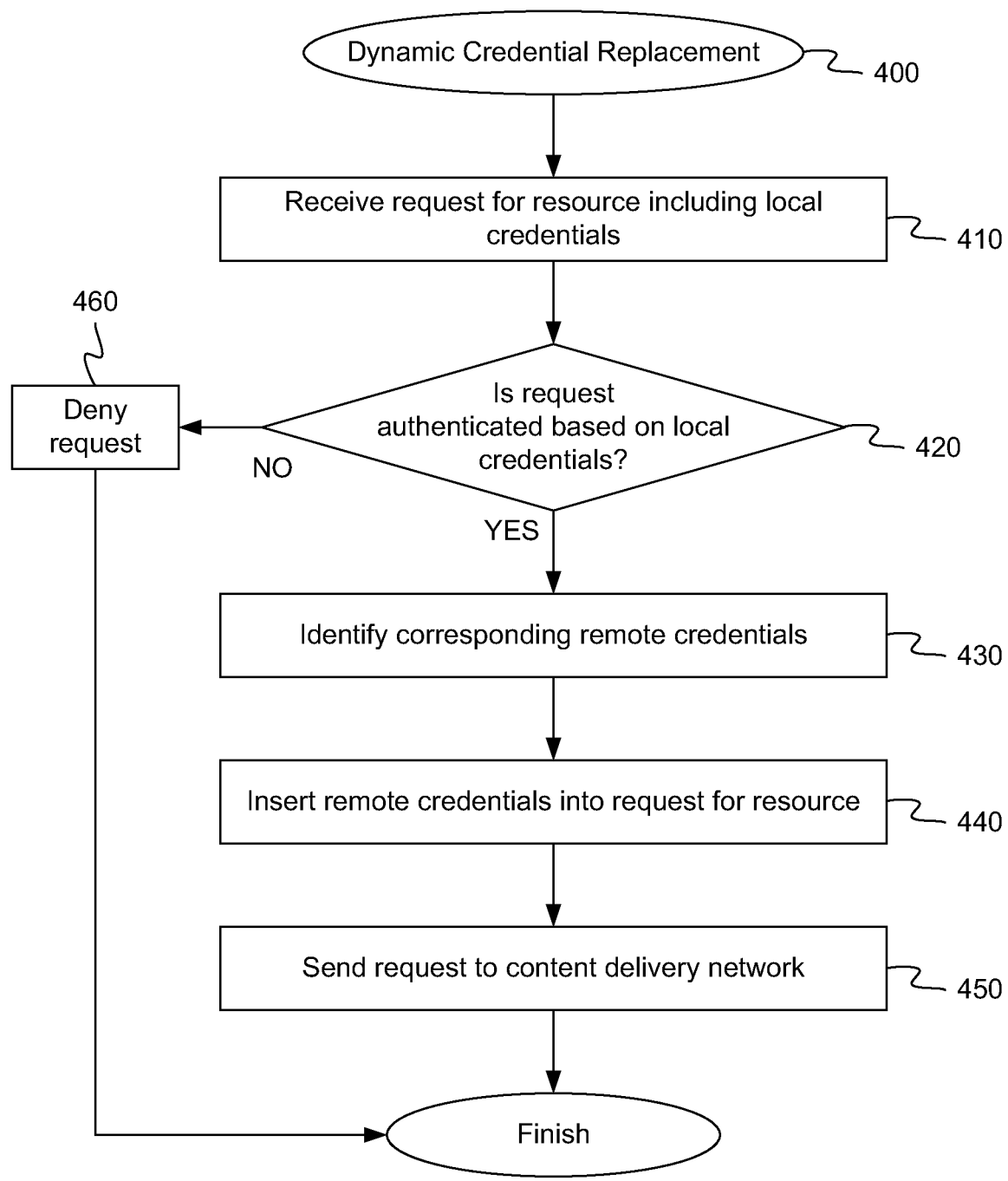
FIG. 4 is a flow diagram illustrating a dynamic security credential replacement method, according to an embodiment.

FIG. 4 is a flow diagram illustrating a dynamic security credential replacement method, according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to dynamically replace security credentials for secure proxying of a request for content or resources. In one embodiment, method 400 may be performed by subscription proxy 112, as shown in FIGS. 1 and 2.

Referring to FIG. 4, at block 410, method 400 receives a request for a resource from one of end user systems 116. In one embodiment, end user systems 116 may direct their requests for content to subscription proxy 112. In addition to an indication of the requested content, the requests may include the local credential provided to the end user system 116 by on-premise subscription service 110. The local credential may include, for example, a digital certificate, as described above.

At block 420, method 400 determines if the request is authenticated based on the local credentials. Local credential authentication module 208 may verify that the local credential is properly associated with the end user system 116 from which it was received and that the end user system is authorized to request and receive the indicated content or resource. In one embodiment, local credential authentication module compares the received local credential to a copy of that local credential in credential data store 222 and/or to permissions indicated in credential mapping database 224.

In one embodiment, if at block 420, method 400 determines that the request is authenticated based on the local credentials (i.e., the requesting end user system had the proper credentials and is authorized to receive the requested content), at block 430, method 400 identifies the corresponding remote credentials. Dynamic credential replacement module 210 may identify the remote credentials corresponding to the received local credentials using credential mapping database 224. In one embodiment, dynamic credential replacement module 210 may locate an entry in credential mapping database 224 for the local credentials provided by end user system 116. Dynamic credential replacement module 210 may identify the corresponding remote security credential, for example, by performing a look-up operation in credential mapping database 224. In one embodiment, an address or location of the proper remote security credential may also be stored in the same entry of credential mapping database 224. The address may point to a location in credential data store 222 or to some other location where the remote credential is stored.

At block 440, method 400 may insert the identified remote security credentials into the request for a resource from content delivery network 104. Dynamic credential replacement module 210 may dynamically replace the local security credentials in the request with the remote credentials for content delivery network 104. At block 450, method 400 sends the request with the remote security credentials to content delivery network 104.

If at block 420, method 400 determines that the request is not authenticated based on the local credentials (i.e., the requesting end user system did not have the proper credentials or is not authorized to receive the requested content), at block 460, method 400 identifies denies the request.

Figure 5:
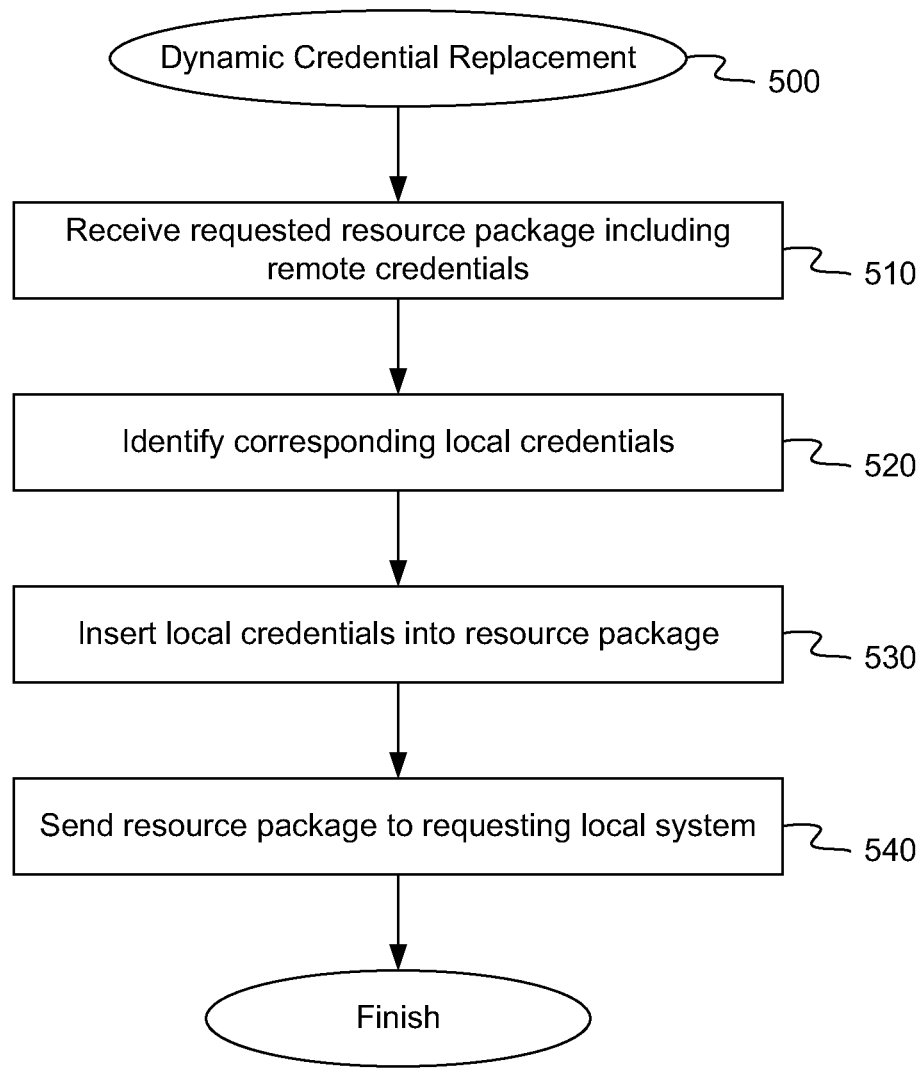
FIG. 5 is a flow diagram illustrating a dynamic security credential replacement method, according to an embodiment.

FIG. 5 is a flow diagram illustrating a dynamic security credential replacement method, according to an embodiment. The method 500 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to dynamically replace security credentials for secure proxying of a request for content or resources. In one embodiment, method 500 may be performed by subscription proxy 112, as shown in FIGS. 1 and 2.

Referring to FIG. 5, at block 510, method 500 receives the requested resource package including the remote security credentials. In one embodiment, subscription proxy 112 receives the requested resource from content delivery network 104. The request may have been previously made by subscription proxy 112 on behalf of one of end user systems 116.

At block 520, method 500 identifies the corresponding local security credentials for the response. In one embodiment, dynamic credential replacement module 210, determines the local credentials using credential mapping database 224. For example, dynamic credential replacement module 210 may locate an entry in credential mapping database 224 for the remote credential that was received with the resource package from content delivery network 104. Dynamic credential replacement module 210 may identify the local credential for the requesting end user systems 116, which may also be found in the same entry of credential mapping database 224. The entry in the database 224 may point to a location in credential data store 222 or to another location where the local security credential is stored.

At block 530, method 500 inserts the identified local security credentials into the resource package from content delivery network 104. Dynamic credential replacement module 210 may dynamically replace the remote security credentials in the package with the local credentials for the requesting end user system 116. At block 540, method 500 sends the resource package with the local security credentials to the requesting end user system 116.

Figure 6:
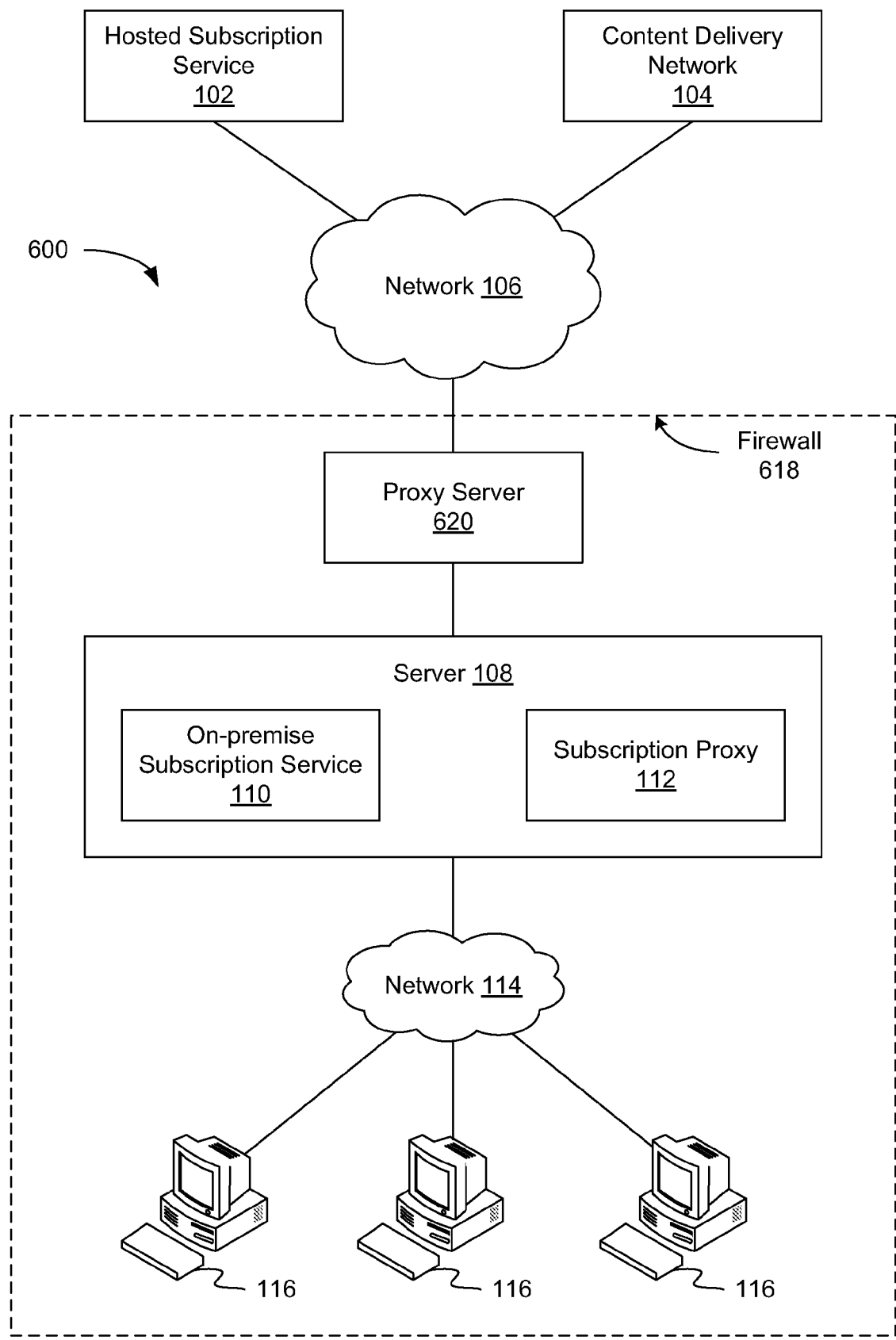
FIG. 6 is a block diagram illustrating a network environment for dynamic replacement of security credentials for secure proxying, according to an embodiment.

FIG. 6 is a block diagram illustrating a network environment for dynamic replacement of security credentials for secure proxying, according to an embodiment. In one embodiment, network environment 600 is similar to network environment 100 described above with respect to FIG. 1, but with the addition of firewall 618 and proxy server 620. Firewall 618 may be a device, or a piece of software running on a device, used to permit or deny network transmissions based upon a set of rules. Firewall 618 may be used to protect a network from unauthorized access while permitting legitimate communications to pass. Firewall 618 may have an outward side facing network 106 (e.g., the Internet). The opposite side of firewall 618 may be a private or corporate network which is protected by the firewall 618. The private network may include, for example, server 108, network 114, end user systems 116 and/or proxy server 620. Proxy server 620 may be a server (e.g., a computer system or an application) that acts as an intermediary for requests from clients (e.g., end user systems 116) seeking resources from other servers (e.g., content delivery network 104). The existing corporate network protected by firewall 618 may be designed to funnel requests for resources through proxy server 620. A system designed to dynamically replace security credentials including server 108 may interoperate with proxy server 620, either by replacing proxy server 620 or by performing the dynamic replacement before requests are sent to proxy server 620. In the latter case, a request with the updated remote security credentials may be sent to proxy server 620 by subscription proxy 112. Proxy server 620 may forward to the request to and receive a response from content delivery network 104 as it was originally designed to do.

Figure 7:
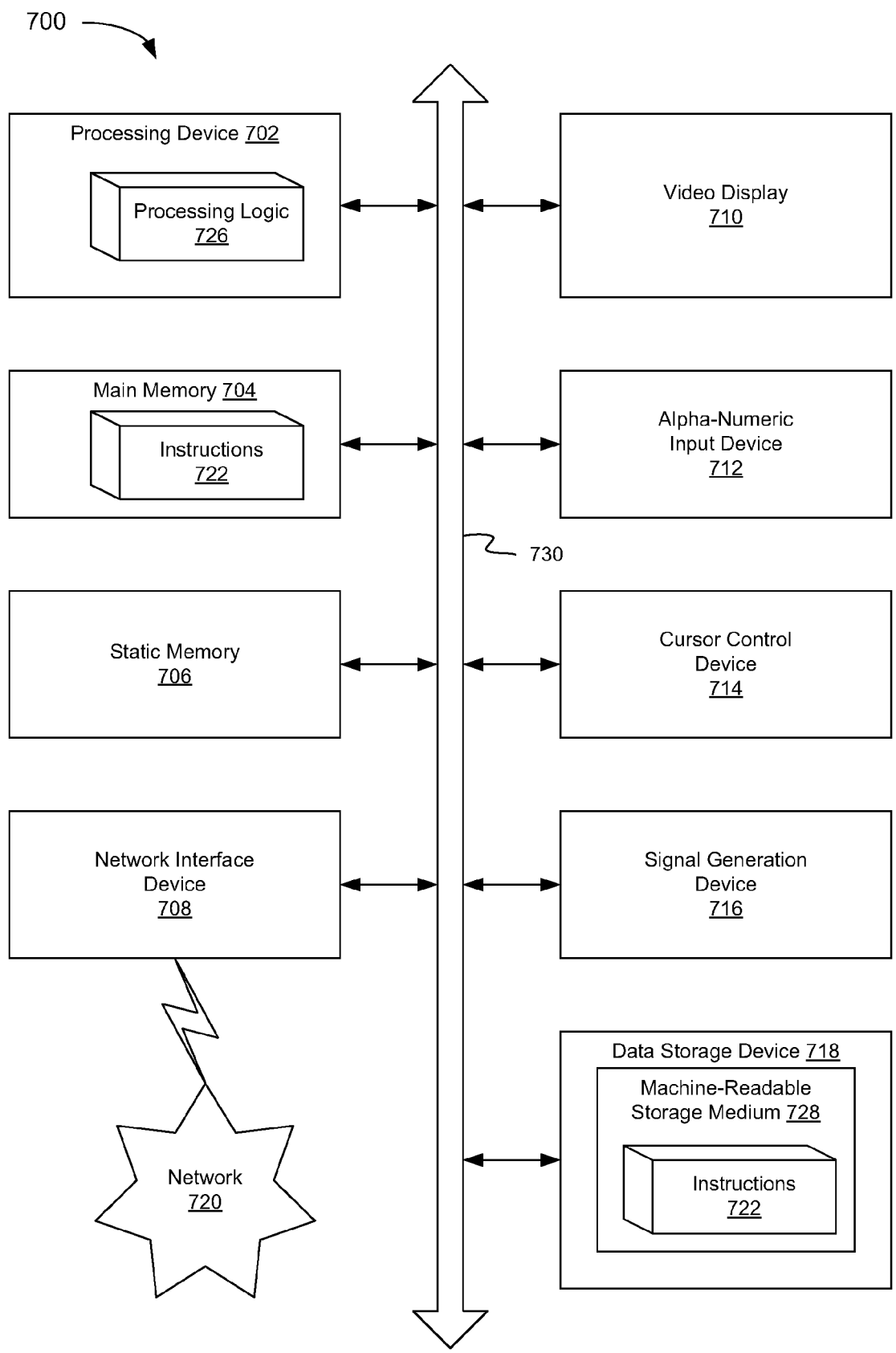
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of server 108 and/or end user systems 130.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions to perform a method for dynamic replacement of security credentials for secure proxying as described above, and/or a software library containing methods that call the above applications. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
preventing, by a processing device, a system from registering with a content delivery network and from applying for a remote credential directly, the preventing comprising:
receiving, from the system, a request for a resource provided by the content delivery network, the request comprising a local credential associated with the system;
determining that the request for the resource is authenticated in view of the local credential;
identifying, by the processing device, the remote credential associated with the content delivery network and corresponding to the local credential;
replacing the local credential in the request with the corresponding remote credential, wherein the replacing comprises removing the local credential from the request and inserting the corresponding remote credential into the request; and
sending the request for the resource with the remote credential to the content delivery network.

2. The method of claim 1, wherein the local credential comprises a digital certificate and is distributed by an on-premise subscription service associated with the system.

3. The method of claim 1, wherein the remote credential comprises a digital certificate and is distributed by a hosted subscription service associated with the content delivery network.

4. The method of claim 3, further comprising:
receiving the remote credential from the hosted subscription service;
storing the remote credential in a credential data store; and
associating the remote credential with the local credential.

5. The method of claim 1, wherein identifying the remote credential comprises accessing a credential mapping database.

6. The method of claim 1, further comprising:
receiving a resource package from the content delivery network, the resource package comprising the requested resource and the remote credential;
identifying the local credential associated with the system and corresponding to the remote credential;
replacing the remote credential in the resource package with the corresponding local credential; and
sending the resource package with the local credential to the system.

7. A system comprising:
a memory store a subscription proxy; and a processing device, coupled to the memory and to execute the subscription proxy, the processing device to:

prevent a system from registering with a content delivery network and from applying for a remote credential directly, wherein the processing device to:

receive, from the system, a request for a resource provided by the content delivery network, the request comprising a local credential associated with the system;

determine that the request for the resource is authenticated in view of the local credential;

identify the remote credential associated with the content delivery network and corresponding to the local credential;

replace the local credential in the request with the corresponding remote credential, wherein to replace the local credential, the subscription proxy to remove the local credential from the request and insert the corresponding remote credential into the request; and send the request for the resource with the remote credential to the content delivery network.

8. The system of claim 7, wherein the local credential comprises a digital certificate and is distributed by an on-premise subscription service associated with the system.

9. The system of claim 7, wherein the remote credential comprises a digital certificate and is distributed by a hosted subscription service associated with the content delivery network.

10. The system of claim 9, wherein the processing device is further to:

receive the remote credential from the hosted subscription service;

store the remote credential in a credential data store; and associate the remote credential with the local credential.

11. The system of claim 7, wherein identifying the remote credential comprises accessing a credential mapping database.

12. The system of claim 7, wherein the processing device is further to:

receive a resource package from the content delivery network, the resource package comprising the requested resource and the remote credential;

identify the local credential associated with the system and corresponding to the remote credential;

replace the remote credential in the resource package with the corresponding local credential; and send the resource package with the local credential to the system.

13. A non-transitory machine-readable storage medium storing instructions which, when executed, cause a processing device to:

prevent a system from registering with a content delivery network and from applying for a remote credential directly, wherein the processing device to:

receive, from the system, a request for a resource provided by the content delivery network, the request comprising a local credential associated with the system;

determine that the request for the resource is authenticated in view of the local credential;

identify, by the processing device, the remote credential associated with the content delivery network and corresponding to the local credential;

replace the local credential in the request with the corresponding remote credential, wherein the replacing comprises removing the local credential from the request and inserting the corresponding remote credential into the request; and send the request for the resource with the remote credential to the content delivery network.

14. The non-transitory machine-readable storage medium of claim 13, wherein the local credential comprises a digital certificate and is distributed by an on-premise subscription service associated with the system.

15. The non-transitory machine-readable storage medium of claim 13, wherein the remote credential comprises a digital certificate and is distributed by a hosted subscription service associated with the content delivery network.

16. The non-transitory machine-readable storage medium of claim 15, wherein the instructions to further cause the processing device to:

receive the remote credential from the hosted subscription service;

store the remote credential in a credential data store; and associate the remote credential with the local credential.

17. The non-transitory machine-readable storage medium of claim 13, wherein to identify the remote credential, the instructions to further cause the processing device to access a credential mapping database.

18. The non-transitory machine-readable storage medium of claim 13, wherein the instructions to further cause the processing device to:

receive a resource package from the content delivery network, the resource package comprising the requested resource and the remote credential;

identify the local credential associated with the system and corresponding to the remote credential;

replace the remote credential in the resource package with the corresponding local credential; and send the resource package with the local credential to the system.

* * * * *